(12) United States Patent
Ito

(10) Patent No.: US 6,658,209 B1
(45) Date of Patent: Dec. 2, 2003

(54) CAMERA WITH ELECTRONIC FLASH DEVICE

(75) Inventor: Toru Ito, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/267,592

(22) Filed: Oct. 10, 2002

(51) Int. Cl.$^7$ ............................................... G03B 15/03
(52) U.S. Cl. ........................................ 396/175; 396/176
(58) Field of Search ................................ 396/175, 176

(56) References Cited

U.S. PATENT DOCUMENTS 6,075,948 A * 6/2000 Petruchik .................... 396/176

* cited by examiner

*Primary Examiner*—W. B. Perkey
(74) *Attorney, Agent, or Firm*—Young & Thompson

(57) ABSTRACT

Sidewalls of a flash opening formed in a front cover of a camera are processed with the same surface treatment as that of the front cover. A condenser plate is so fitted into the flash opening from a backside of the front cover that a part of the condenser plate is protrusive from and another part is retractive from an outer surface of the front cover. In a place where the condenser plate is retractive, a part of sidewalls are exposed outside. In wildest-angle photography, edges of a flashlight reflector containing a flash discharge tube are moved to a position between the outer surface and an inner surface of the front cover touching a top surface of the condenser plate. Thus, the camera with a zoom flash device is made thinner.

11 Claims, 3 Drawing Sheets

CAMERA WITH ELECTRONIC FLASH DEVICE

BACKGROUND OF THE INVENTION

1. Field of the Invention

The present invention relates to a camera with an electronic flash device.

2. Background Arts

Cameras having an electronic flash device in order to enable photography at night and in darkness are generally used. The electronic flash device has an optical panel, e.g. a condenser plate with a Fresnel lens surface, disposed in front of a flash discharge tube, and a flashlight is emitted to a subject through the condenser plate. The condenser plate prevents unevenness of illumination between a central area and a peripheral area of a photographic field.

Previously, the condenser plate was so fitted into a front wall of a front cover of the camera as to be flat with an outer surface of the front cover. However recently as the camera has become thinner, the condenser plate has been so disposed as to protrude from the outer surface of the front cover. The condenser plate is disposed in an edge of the front wall of the camera, so that especially when the front cover is a convexly curved surface the top of which is around the center of the camera, protrusion of the condenser plate from the front cover enlarges. There is no visual neatness in disposing the condenser plate, so the camera may have a very poor appearance and shape.

SUMMARY OF THE INVENTION

A main object of the present invention is to provide a camera in which an optically panel can be neatly disposed for the camera to have a high quality in the appearance and shape.

Another object of the present invention is to provide a camera which is made thinner and smaller.

To achieve the above and other objects, according to the present invention, sidewalls of a flash opening formed in a front cover are processed with the same surface treatment as that for the front cover. An optical panel is so fitted into the flash opening from a backside of the front cover that a part of it is protrusive from, and another part of it is retractive into the outer surface of the front cover. In a place where the optical panel is retractive into the outer surface of the front cover, a part of the sidewalls of the flash opening are exposed outside. However, the exposure of the sidewalls does not spoil appearance of the camera because the sidewalls are processed with the surface treatment.

In the following preferred embodiment of the present invention, a camera has a flash device with a zoom function. The zoom flash device is provided with a movable frame holding a flash discharge tube and a flashlight reflector. Since the movable frame varies a distance between the optical panel and the flash discharge tube in accordance with power of photography by means of moving in a direction of emitting a flashlight inside the camera, an illuminating angle of the flashlight varies. In a wide-angle photography the flash discharge tube is positioned near to the condenser plate, and in telephotography the flash discharge tube is positioned far from it. In the widest-angle photography, edges of the flashlight reflector are moved to a position inside a width between an outer surface and an inner surface of a front cover touching a top surface of the condenser plate. Therefore, even in the camera having the zoom flash device which requires much space, it is possible to make the camera thinner.

BRIEF DESCRIPTION OF THE DRAWINGS

The above and other objects and advantages of the present invention will become apparent from the following detailed description of the preferred embodiment when read in association with the accompanying drawings, which are given by way of illustration only and thus are not limiting the present invention. In the drawings, same reference numerals designate like or corresponding parts throughout the several views, and wherein.

DETAILED DESCRIPTION OF THE EMBODIMENTS

Figure 1:
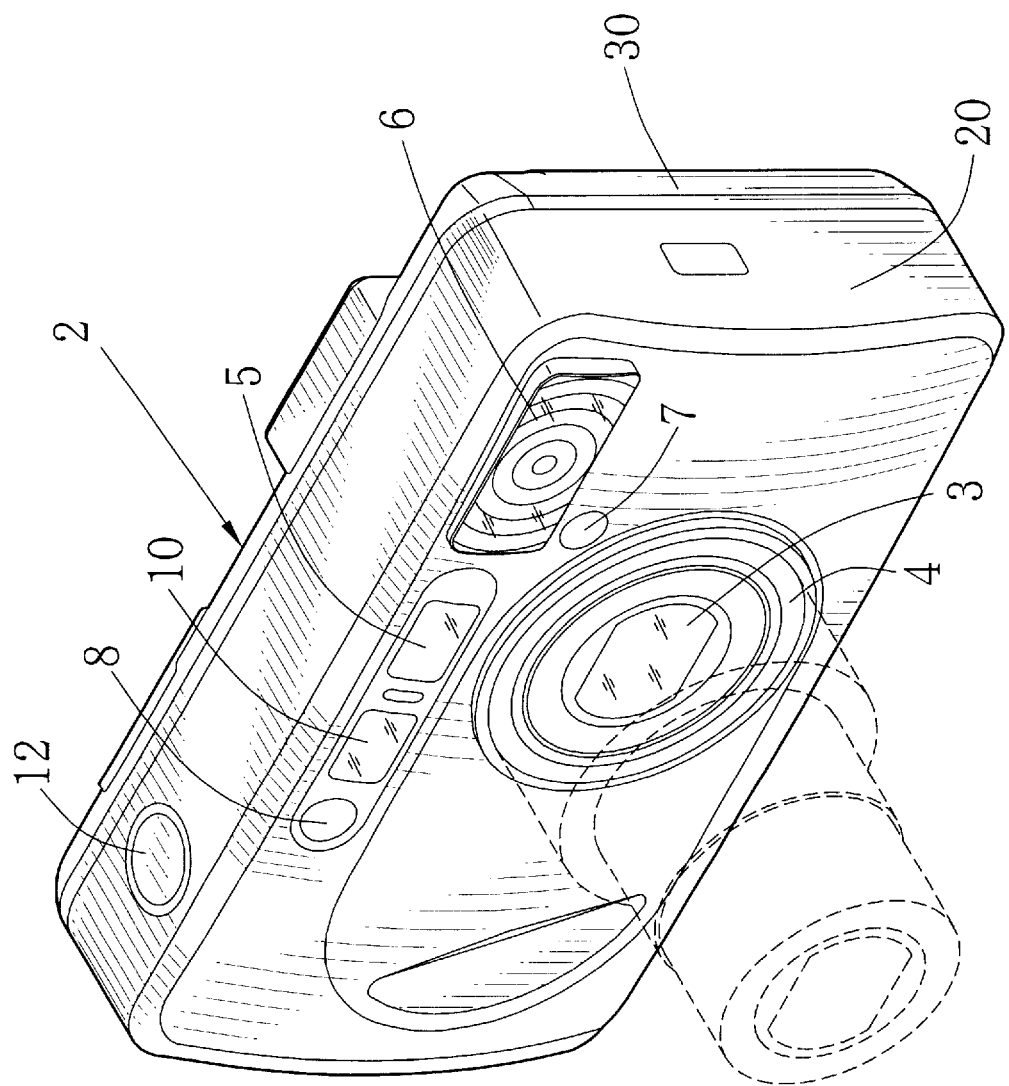
FIG. 1 is a front perspective view of a camera.

Referring to FIG. 1, a camera 2 has a front cover 20 and a rear cover 30. In the front cover 20, there are provided a lens barrel 4 holding a taking lens 3, a viewfinder objective window 5, an optical panel for regulating a direction of emitting a flashlight, e.g. a condenser plate 6 having a Fresnel surface, a self timer emitting window 7 to inform photographic timing with blink in timer photography, a photometry window 8 for photometry of subject brightness, and a range-finding window 10 for finding range. When main power of the camera 2 is off, the lens barrel 4 is contained inside the camera 2 (shown with solid lines in FIG. 1). When the main power is turned on, the lens barrel 4 is protruded from the front wall of the camera 2 and moves to a wide-angle position, and then stops at a desired zoom position according to a zooming operation (shown with dotted lines in FIG. 1). Also there is a release button 12 in a top wall of the camera 2.

Figure 2:
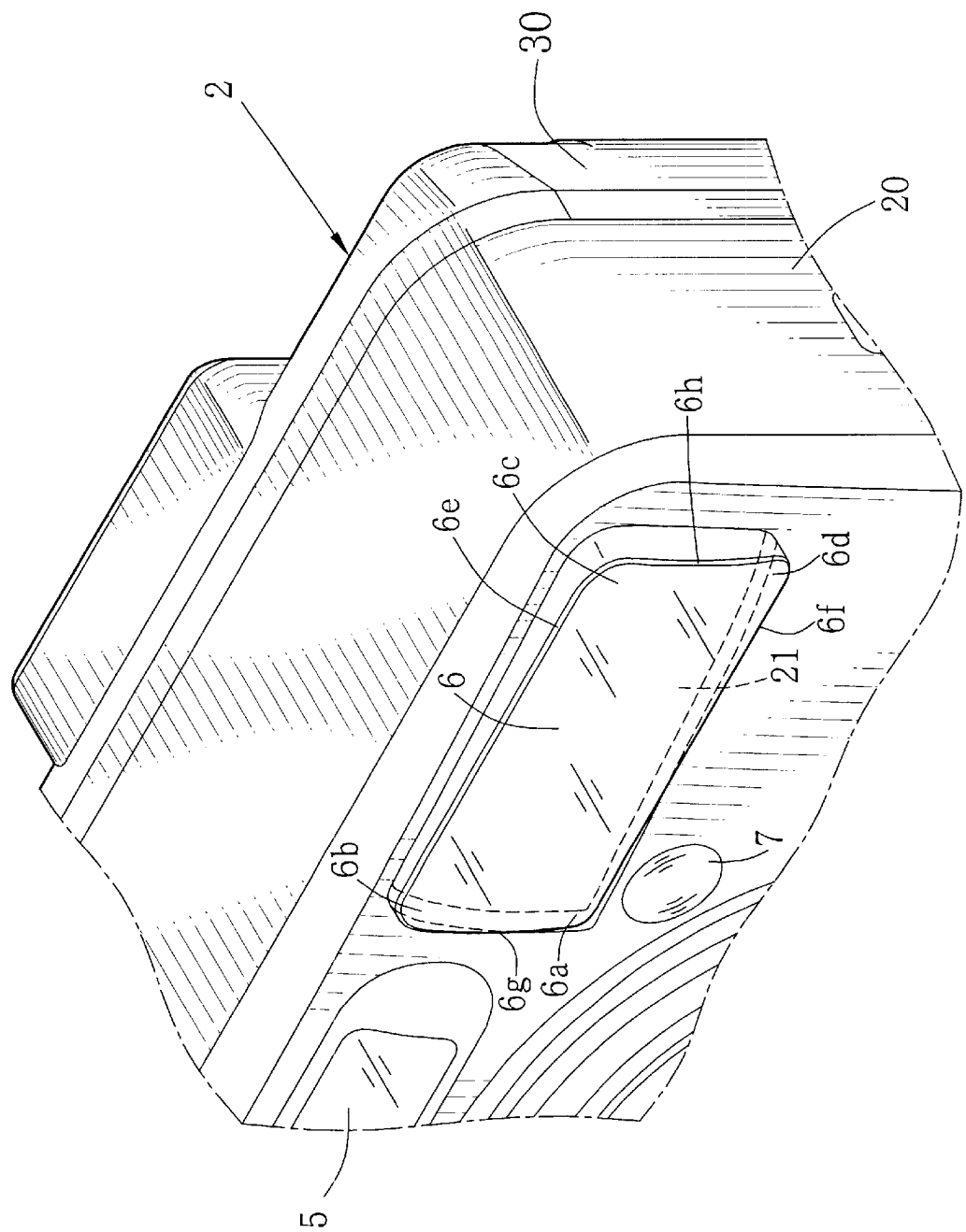
FIG. 2 is an enlarged perspective view showing a vicinity of a condenser plate.

The front cover 20 is formed out of a metal like aluminum with press working. A front wall of the front cover 20 is a convex surface, the top of which is around the taking lens 3. In an upper right corner of the front cover 20, as shown in FIG. 2, a flash opening 21 is formed. Sidewalls of the flash opening 21 are processed and finished with the same surface treatment as that for an outer surface of the front cover 20, e.g. anodic oxide coating or anodized aluminum coating. As for the surface treatment means besides the anodic oxide coating, there are oxide film treatment, painting, plating, abrasive blasting, creping, and the like.

Figure 3:
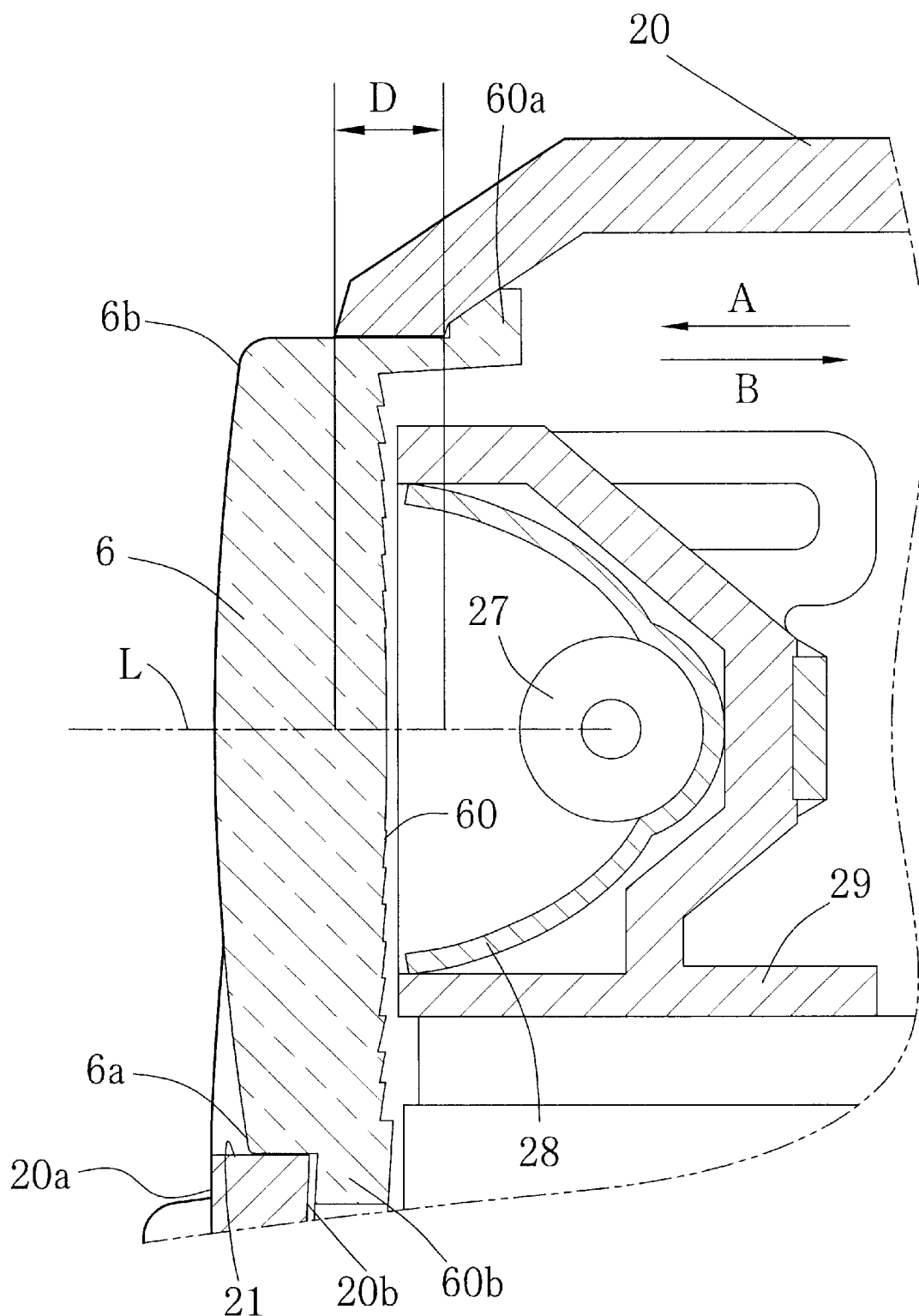
FIG. 3 is a longitudinal sectional view showing the vicinity of the condenser, plate.

Referring to FIG. 3, the optical panel for regulating the illuminating angle of the flashlight, e.g. the condenser plate 6, is fitted into the flash opening 21 from a backside of the front cover 20. This condenser plate 6 is a Fresnel lens, in a rear surface of which a Fresnel surface 60 is formed. A front surface of the condenser plate 6 is convexly curved in a vertical direction. Four ridges 6e to 6h are defined between the front surface and a top surface of the condenser plate 6, between the front surface and a bottom surface, between the front surface and both side surfaces and are provided with curved surfaces as shapes defined by chamfering at a small width. The ridge 6f between the front and bottom surfaces is less curved. Also four corners 6a to 6d of the front surface of the condenser plate 6 are circular arcs.

The condenser plate 6 and the flash opening 21 are quadrilateral. In an upper edge of the condenser plate 6, its front surface is protrusive forward from the outer surface of the front cover 20. And the Fresnel surface 60 is positioned ahead of the inner surface of the front cover 20, for example inside the flash opening 21. In the upper edge of the condenser plate 6, is provided a claw 60a which extends backward for engaging with the inner surface of the front cover 20. In a lower edge of the condenser plate 6, there is a projection 60b which extends downward for abutting a part of the inner surface of the front cover 20.

Behind the condenser plate 6, there is a flash device including a flash discharge tube 27 and a flashlight reflector 28 which are fitted on a moving frame 29. This flash device has a zooming function, so that the moving frame 29 moves in a direction of emitting the flashlight. In wide-angle photography, for example, the moving frame 29 moves forward (in a direction of A in FIG. 3), and in telephotography the moving frame 29 moves backward (in a direction of B in FIG. 3). Thus an illuminating angle of the flashlight varies in accordance with magnifying power of the photography. FIG. 3 shows a position of the moving frame 29 in the wide-angle photography.

Now, the operation of the present invention will be described. The front cover 20 is so formed with press working that the front wall is convexly curved. The outer surface of the front cover 20 and the sidewalls of the flash opening 21 are processed with the anodic oxide coating. Then, the condenser plate 6 is fitted into the flash opening 21 from the backside of the front cover 20. Since the front wall of the front cover is a convex surface, a part 6a of the condenser plate 6 (a left-under corner in FIG. 2) is positioned inside the front cover 20. In other words, as shown in FIG. 3, the corner 6a of the condenser plate 6 is positioned between the outer surface 20a and the inner surface 20b of the front cover 20, namely within a thickness of the front cover 20. The other corners 6b to 6d are protrusive from the outer surface 20a of the front cover 20. Accordingly, a part of the sidewalls of the flash opening 21 are exposed, but the exposure does not spoil appearance of the camera 2 because the sidewalls are processed with the anodic oxide coating. Also the corner 6a of the condenser plate 6 is positioned inside the outer surface 20a of the front cover 20, and at least the ridges 6e, 6g and 6h between the front and top surfaces, and between the front and both side surfaces are made up of curved surfaces. Thus, it is possible to make the protrusion of the condenser plate 6 inconspicuous.

The front cover 20 with the condenser plate 6 is fitted on the front of a main body, in which a photographic mechanism and the like are installed. The camera 2 has a zoom flash device, and in the case of the wide-angle photography with the low magnifying power the moving frame 29 holding the flash discharge tube 27 and the flashlight reflector 28 moves in the direction of A in FIG. 3. The zoom flash device approaches the rear surface of the condenser plate 6 close to the edges of the flashlight reflector 28 are positioned inside the range of D, which is between the outer surface 20a and the inner surface 20b of the front cover 20 touching the top wall of the condenser plate 6. Therefore, although the camera 2 has the zoom flash device requiring much space, it is possible to make the camera 2 thinner.

In the above embodiment, the flash opening 21 and the condenser plate 6 are quadrilateral with four corners. However, the flash opening 21 and the condenser plate 6 may be D-shaped by transforming two of the four corners into one arc, or elliptic.

Although the present invention has been described with respect to the camera with the zoom flash device, the present invention is also applicable to a camera with a flash device in which an illuminating angle of a flashlight is fixed. Furthermore, the present invention is applicable to a digital camera.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. A camera with a flash device comprising:
    a front cover disposed as a camera front wall, an outer surface of said front cover being processed with a surface treatment;
    a flash opening formed in said front cover, sidewalls of said flash opening being processed with said surface treatment with which said outer surface of said front cover is processed; and
    an optical panel fitted into said flash opening, a part of a front surface of said optical panel being positioned inside said flash opening, the rest of said front surface of said optical panel being protrusive from said outer surface of said front cover.

2. A camera as recited in claim 1, wherein said outer surface of said front cover is so curved as to expand a camera center, and said flash opening is formed therein.

3. A camera as recited in claim 2, wherein at least in an upper edge of said optical panel, said front surface of said optical panel is protrusive forward from said outer surface of said front cover, and a rear surface of said optical panel is positioned inside said flash opening.

4. A camera as recited in claim 3, wherein a periphery of said front surface of said optical panel is chamfered.

5. A camera as recited in claim 4, wherein said flash opening and said optical panel is substantially quadrilateral with four corners, among which at least one corner at a lower edge of said optical panel is positioned inside said flash opening.

6. A camera as recited in claim 5, wherein a claw is formed in said upper edge of said optical panel, said claw extending backward from said rear surface of said optical panel for engaging with said inner surface of said front cover when said optical panel is fitted into said flash opening from a backside of said front cover.

7. A camera as recited in claim 6, wherein a projection extending downward is formed in said lower edge of said optical panel for abutting on a part of said inner surface of said front cover.

8. A camera as recited in claim 7, wherein said front surface of said optical panel is a convex surface curved in a vertical direction, and said rear surface of said optical panel is a Fresnel surface.

9. A camera with a flash device having a flash discharge tube and a flashlight reflector comprising:
    a front cover disposed as a camera front wall, an outer surface of said front cover being processed with a surface treatment;
    a flash opening formed in said front cover, sidewalls of said flash opening being processed with said surface treatment with which said outer surface of said front cover is processed;
    an optical panel fitted into said flash opening from a backside of said front cover, a part of a front surface of said optical panel being positioned inside said flash opening, the rest of said front surface of said optical panel being protrusive forward from said outer surface of said front cover; and a moving frame for holding said flash discharge tube and said flashlight reflector, said moving frame moving said flashlight reflector toward or away from said optical panel in accordance with magnifying power of photography in order to vary an illuminating angle of a flashlight emitted from said flash discharge tube.

10. A camera as recited in claim 9, wherein at least a front surface of an upper edge of said optical panel is protrusive forward from said outer surface of said front cover, and at least a rear surface of said upper edge of said optical panel is positioned inside said flash opening, so that a front surface of an upper edge of said flashlight reflector is movable to a position inside said flash opening.

11. A camera as recited in claim 10, wherein a claw is formed in said upper edge of said optical panel, said claw extending backward from said rear surface of said optical panel for engaging with said inner surface of said front cover when said optical panel is fitted into said flash opening from a backside of said front cover.

* * * * *